J. M. BRALY.
ROLLER.
APPLICATION FILED OCT. 10, 1907.

898,827.

Patented Sept. 15, 1908.
2 SHEETS—SHEET 1.

WITNESSES
G. R. Thomas
John K. Blackwood

INVENTOR
John M. Braly
BY Munn & Co
ATTORNEYS

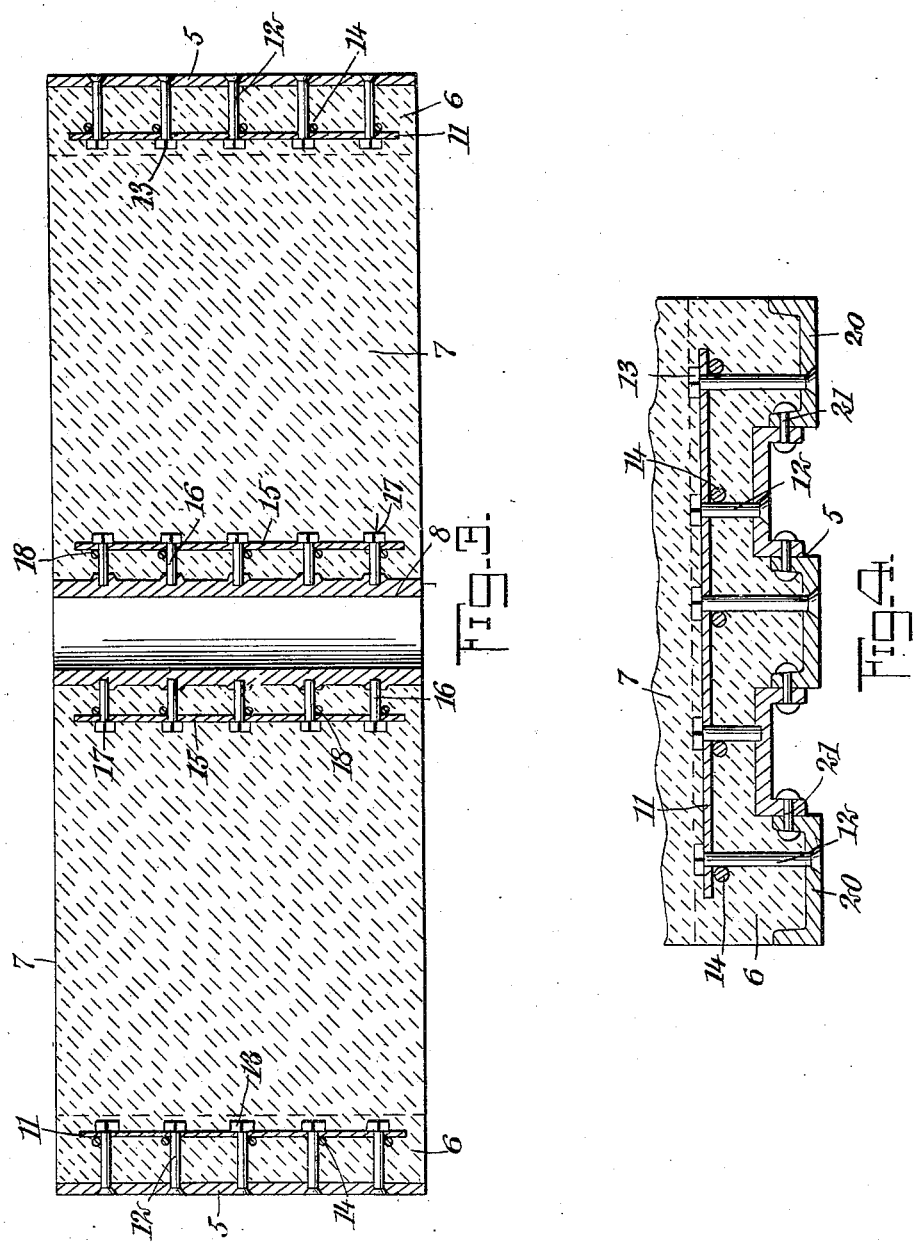

UNITED STATES PATENT OFFICE.

JOHN M. BRALY, OF VILLAPARK, NEW JERSEY.

ROLLER.

No. 898,827.

Specification of Letters Patent.   Patented Sept. 15, 1908.

Application filed October 10, 1907. Serial No. 396,763.

*To all whom it may concern:*

Be it known that I, JOHN M. BRALY, a citizen of the United States, and a resident of Villapark, in the county of Monmouth and State of New Jersey, have invented a new and Improved Roller, of which the following is a full, clear, and exact description.

This invention relates to rollers, and is particularly useful in connection with road and lawn rollers as well as rollers for other purposes.

An object of the invention is to provide a simple, strong and inexpensive roller having a smooth and hard rolling surface, and so constructed that the height of the roller is suitably proportioned to the weight thereof, to render the device most efficient.

A further object of the invention is to provide a device of the class described having a tire of metal, and a body of cement or concrete within the tire, giving the requisite weight to the roller and strengthened to resist various stresses by means of embedded reinforcing members.

A still further object of the invention is to provide a roller having a tire, and within the tire a body of reinforced cement or concrete, the tire serving as a mold for the plastic material in the manufacture of the roller.

The invention consists in the construction and combination of parts to be more fully described hereinafter and particularly set forth in the claims.

Figure 1:
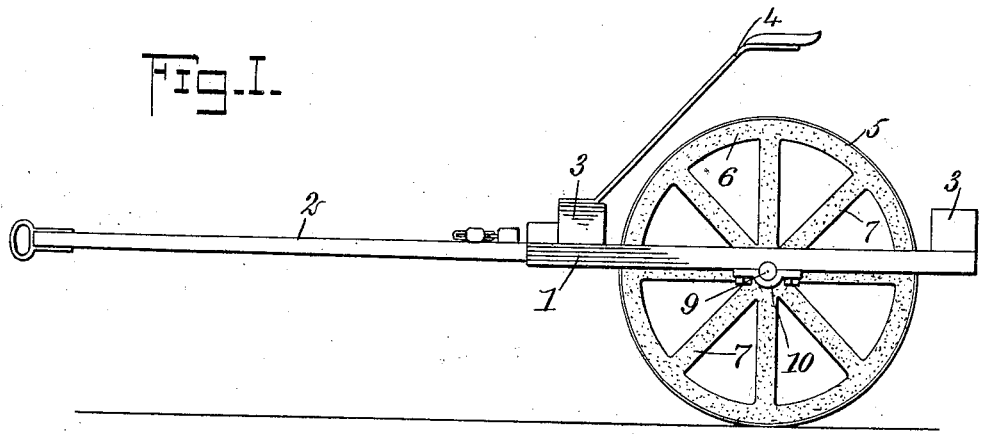
Figure 2:
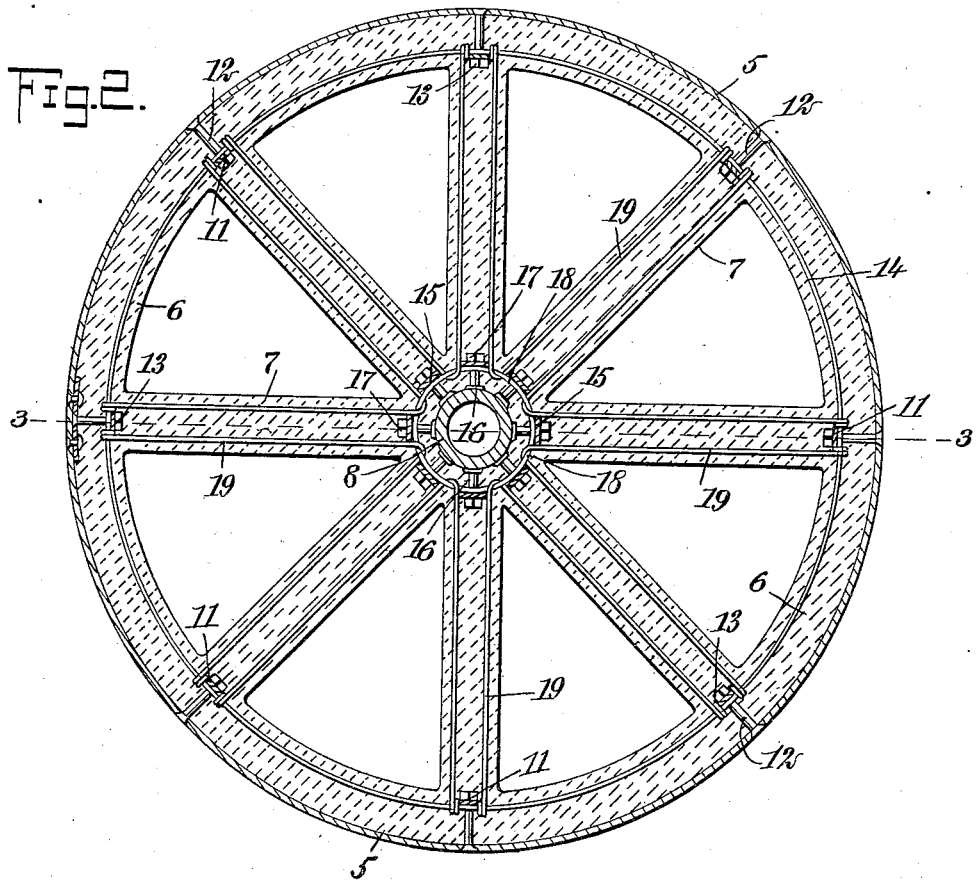

Reference is to be had to the accompanying drawings forming a part of this specification, in which similar characters of reference indicate corresponding parts in all the views, and in which Figure 1 is a side elevation of my roller; Fig. 2 is an enlarged, transverse section of the roller; Fig. 3 is an enlarged, longitudinal section on the line 3—3 of Fig. 2; and Fig. 4 is an enlarged, transverse section showing a part of a roller of modified form.

Before proceeding to a more detailed explanation of my invention it should be understood that rollers are largely employed for compacting the earth in road making, gardening, and for various other purposes such as reservoir and reclamation work, landscape gardening, and the like. It is customary to fashion the cylindrical rollers from material such as cast iron or steel, the mass of the metal giving the device the requisite weight. Ballast consisting of water in tanks, stones, pig-iron or the like is often used in connection with rollers. This method of adding weight, however, necessitates a suitable frame-work and makes the roller more expensive and more difficult to handle. When the roller is weighted merely by the mass of iron used in its construction, the device is expensive to manufacture. I provide an efficient roller, which is simple and cheap to manufacture, by employing cement or concrete for the body of the roller, enveloped by a suitable shell or tire of metal which gives a rolling surface of the requisite strength and hardness. It will be understood that while I preferably employ cement or concrete, any other suitable plastic material which hardens or sets as does cement or concrete, can be employed for the purpose, and the term "concrete" used hereinafter, is intended to signify generally, any such suitable material.

One of the great advantages of my roller is found in the manufacture of the same, in which the outer shell or tire serves as a mold for the inner cement or concrete body; thus, no extra expense is entailed in molding the concrete or in shrinking on the tire. A roller made of solid concrete would be too heavy for any given diameter; that is, it would be too low for a given weight to be used efficiently. For this reason I employ cores in the manufacture of the roller, and provide the concrete body with a rim, hub and spokes, thereby producing a high and easy running roller of any desired weight. I reinforce the cement or concrete to resist stresses and strains incident to the use of the roller, as will appear more fully hereinafter.

Referring more particularly to the drawings, I employ a roller frame of any preferred or common form. It should be noted that the frame of the roller does not constitute a part of my invention and may be of any type to suit local conditions or methods of operating the device.

In Fig. 1 is illustrated an example of the frame which may be employed with my roller. The frame 1 has a tongue 2 by means of which draft animals can be attached to it, and further, is provided with ballast boxes 3 and a seat 4. If so desired, the usual brake and scraper can be mounted upon the frame.

The roller, itself, is preferably provided with a cylindrical outer shell or tire 5, which may be of any suitable material such as iron or steel. Within the tire 5 is arranged a cement or concrete body comprising the rim 6 and spokes 7. The rim is concentric with the tire, whereby the roller is evenly balanced. The spokes 7 are radial, and of such form and number that the balance of the roller is in no way disturbed thereby. Concentric with the shell 5 is a longitudinal sleeve or hub 8 of steel, iron or other suitable material, and surrounded by the inner ends of the spokes 7, which form at their junctions an outer hub around the hub 8. An axle 9 is revolubly arranged within the hub 8 and is suitably mounted by means of bearings 10 upon the frame of the roller.

Longitudinal bars 11, are arranged within the shell parallel to the elements thereof and are connected with the shell by means of bolts 12, the heads of which are countersunk in suitable openings within the shell. The bolts 12 extend through openings of the bars 11 and are secured in place by means of nuts 13. Reinforcing rods 14, preferably of annular form, are arranged concentric with the shell and between the latter and the bars 11, the rods 14 resting against the bars. Similar bars 15 are located adjacent to the hub 8 and parallel to the longitudinal axis thereof. The bars 15 are connected with the hub by means of bolts 16 having the ends arranged in threaded openings of bosses formed upon the hub, the ends of the bolts 16 being secured to the bars 15 by means of nuts 17. Annular reinforcing rods 18, are arranged between the hub and the bars 15, resting against the latter. Radial reinforcing members 19, comprising rods bent into V-shape, connect the rods 14 and the rods 18; the ends of the legs of the V-shaped members are twisted about the outer rods 14, while the members pass around the inner rods 18, as is shown most clearly in Fig. 2. The arrangement is such that the bars 11 and the rods 14 are embedded within the rim of the body, while the radial members 19 are embedded within the spokes. The inner bars 15, together with the rods 18 are embedded within the cement or concrete hub formed at the junction of the spokes. The reinforcing members are so arranged that they resist both tension and compression stresses in the cement or concrete body; for instance, when the roller passes over a stone or sharp edge which results in a bending movement at the rim. The reinforcement, furthermore, prevents the cracking of the cement or concrete, owing to stresses induced by motion or by temperature changes. As all reinforcing metal is enveloped by the cement or concrete, it is protected from injury due to rusting.

In Fig. 4 is shown a modified form of roller in which the rolling surface is corrugated. This type of roller is used for various purposes, for instance, in reservoir and reclamation work. I provide a corrugated surface by fashioning the outer shell or tire from annular channels 20, the adjacent channels being oppositely arranged, with the contiguous flanges secured together by means of bolts or rivets 21.

Having thus described my invention I claim as new, and desire to secure by Letters Patent:—

1. A roller, having a hub, a body of concrete encompassing said hub, and radial reinforcing members embedded in said body.

2. A roller having an outer shell, and within said shell a concrete body comprising a rim and spokes.

3. A roller having an outer shell, a hub, a concrete body between said shell and said hub, members embedded in said body and arranged longitudinally of said shell and said hub, and further members embedded in said body and arranged transversely of said shell and said hub.

4. A roller having an outer shell, a hub, a concrete body between said shell and said hub, members embedded in said body and arranged longitudinally of said shell and said hub and secured thereto, and further members embedded in said body and arranged radially, said further members being secured to said first members.

5. A roller having an outer shell, a hub, a concrete body between said shell and said hub, members embedded in said body and arranged longitudinally of said shell and said hub, and V-shaped members having the apexes engaging certain of said first members, and the ends engaging others of said first members, said body having openings formed therein between the sides of said V-shaped members.

6. A roller, comprising an outer shell, a hub within said shell, and a concrete body arranged between said shell and said hub, said body maintaining said hub concentric with said shell and having embedded therein reinforcing members secured to said shell and said hub.

7. A roller, comprising an outer shell, a hub within said shell, and a concrete body comprising a rim and spokes and arranged between said shell and said hub, said body being provided with reinforcing members embedded therein, and serving to maintain said hub concentric with said shell.

8. A roller, comprising an outer shell, a hub, a concrete body arranged within said shell, said shell serving as a mold for said body when the same is plastic, and serving further as a tire for the roller and reinforcing means rigidly connecting said shell and said hub.

9. A roller, comprising an outer shell, and a concrete body arranged within said shell, said body comprising a rim and spokes, and having reinforcing members embedded therein, said shell serving as a mold for said body when the same is plastic, and serving further as a tire for the roller.

10. A roller, comprising a tire, a hub, bars arranged within said tire and longitudinally thereof, means for securing said bars to said tire, substantially radial members secured to said bars and said hub, a concrete body within said tire and comprising a rim and spokes, said bars being embedded in said rim and said radial members being embedded in said spokes, said body further having annular reinforcing members arranged between said tire and said bars within said rim.

11. A roller, comprising a tire, a hub, bars arranged around said hub longitudinally thereof, means for securing said bars to said hub, substantially radial members secured to said bars and said tire, annular reinforcing members arranged between said bars and said hub, and a concrete body within said tire and comprising a rim and spokes, said spokes at their junction forming a second hub around said first hub, said bars being embedded in said second hub said radial members being embedded in said spokes.

12. A roller, comprising a tire, a hub, bars arranged within said tire and longitudinally thereof, further bars arranged around said hub and longitudinally thereof, bolts for securing said bars and said further bars to said tire and said hub respectively, substantially radial members secured to said bars and engaging said further bars, annular reinforcing members arranged between said bars and said tire, further annular reinforcing members arranged between said further bars and said hub, and a concrete body within said tire and comprising a rim and spokes, said spokes at their junction forming a second hub around said first hub.

In testimony whereof I have signed my name to this specification in the presence of two subscribing witnesses.

JOHN M. BRALY.

Witnesses:
  N. S. COOK,
  W. B. VAN LEER.